United States Patent Office 3,496,115
Patented Feb. 17, 1970

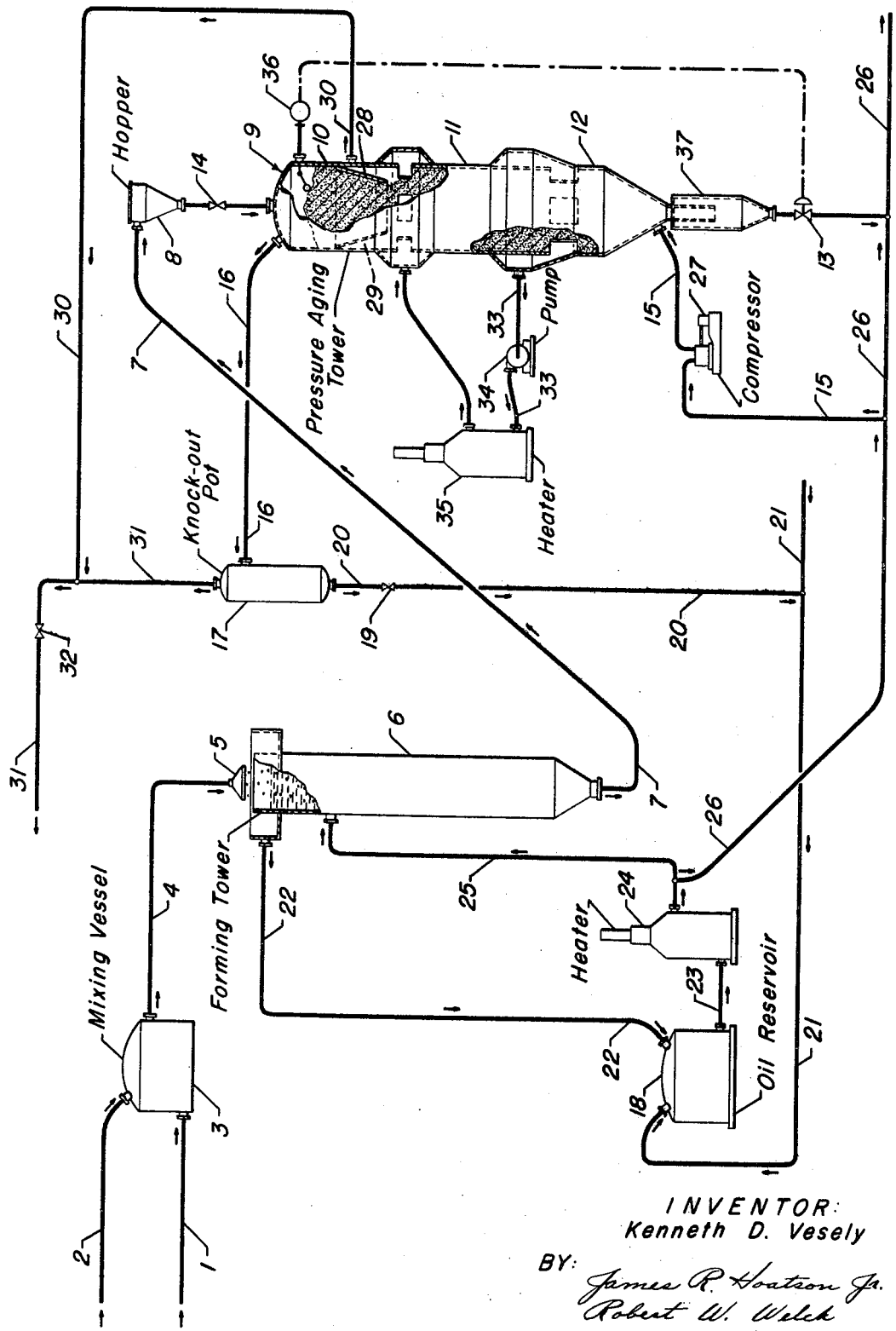

3,496,115
PREPARATION OF SPHERICAL
ALUMINA PARTICLES
Kenneth D. Vesely, La Grange Park, Ill., assignor to Universal Oil Products Company, Des Plaines, Ill., a corporation of Delaware
Filed May 26, 1966, Ser. No. 553,170
Int. Cl. B01j 11/44; C01b 13/14; C10g 11/04
U.S. Cl. 252—448                        5 Claims

ABSTRACT OF THE DISCLOSURE

Continuous pressure aging of spheroidal alumina-containing hydrogel particles by gravitating the particles downwardly through a hot oil medium in an aging tower divided into three zones and maintained under superatmospheric pressure. Freshly formed, relatively cool particles, containing a hydrolyzable weak base such as hexamethylenetetramine, are introduced to the top of the uppermost zone which serves as a particle heating zone. The particles pass downwardly therethrough countercurrent to an ascending flow of hot oil and are gradually heated to 240°–500° F. The particles continue their passage into and through the second zone where the aging is completed. In the third or lowermost zone, the particles are cooled to 100°–200° F. by countercurrent contact with an ascending flow of relatively cool oil and are withdrawn from the aging tower.

---

This invention relates in general to the manufacture of spheroidal inorganic oxide particles and, in particular, to the manufacture of spheroidal alumina particles. The use of inorganic oxides such as silica, alumina, silica-alumina, etc., in substantially spheroidal shape offers numerous advantages when employed as an absorbent, or as a catalyst, or component of a catalyst, for the conversion of organic compounds and especially for the conversion of hydrocarbons. When employed as a fixed bed in a reaction or contacting zone, the spherically shaped particles permit, a more uniform packing, thereby reducing variations in the pressure drop through said fixed bed, and in turn reducing channeling which inherently results in a portion of the bed being by-passed.

Spheroidal inorganic oxide particles of uniform size and shape, and of uniform physical characteristics, have been prepared by dispersing an inorganic oxide hydrosol in the form of droplets into a suitable gelling medium and, immediately thereafter, subjecting the resulting hydrogel spheres to a particular series of aging treatments in a basic medium. The gelling medium employed may be any suitable water immiscible suspending liquid. The gelling medium is usually a light gas oil chosen principally for its high interfacial tension with respect to water. Passage of the droplets through the oil suspending medium produces two effects. First, as each droplet penetrates the oil surface it draws into a spherical shape. The droplets are principally water at this stage and, being insoluble in the oil, they tend to draw into a shape resulting in the least surface area for their volume. The second effect is that the formed spheres are given time to gel and build an initial structure while gravitating to the bottom of the suspending oil so that sufficient structural stability is establishd to resist the strains by the transfer and subsequent treatment in the aging process. The hydrogel spheres are subjected to the aging treatment in order to impact thereto certain desirable physical characteristics.

Alumina spheres, or alumina-containing spheres such as composites of silica and alumina, are not as readily manufactured by this method as are some other inorganic oxide spheres such as, for example, silica spheres. While silica-alumina spheres can be formed by thermal setting, as in the case of silica, by utilizing an aluminum salt as an alumina source, the same is not true when the alumina source is an alumina sol. Nevertheless, an alumina sol is a preferred alumina source since it affords better average bulk density and surface area control, as well as other important advantages which are not realized with an aluminum salt. In order to obtain acceptable spherical particles utilizing a sol as an alumina source, it is necessary to employ a sol which will not set into a gel until a suitable time interval has elapsed. For example, when adding a conventional gelling agent, such as ammonium hydroxide, to an alumina sol a gelatinous precipitate occurs almost immediately. Thus, the desired spheroidal particles cannot be formed by the method herein contemplated since the time differential is not sufficient to permit passing the sol into a suspending medium before gelation occurs so that the sol may assume the desired shape and gel during passage therethrough. However, alumina spheres can be manufactured by a method which comprises commingling, at below gelation temperature, an alumina hydrosol and a weak base of specific properties. It is generally considered that hexamethylenetetramine, being a weak base with a strong buffering action at a pH of from about to about 10 and a rate of hydrolysis which increases with temperature, is most suitable. The resultant mixture can be dispersed in the form of droplets while still below gelation temperature into an oil suspending medium maintained at an elevated temperature effecting hydrolysis of the hexamethylenetetramine and accelerating gelation of the hydrosol at a suitable rate into firm, but elastic, sphere. However, the temperature must be such as to maintain the water content of the spherical particles in substantially liquid phase otherwise the hydrogel spheres tend to rupture and otherwise weaken.

Only a fraction of the hexamethylenetetramine is hydrolyzed in the sphere forming process at the conditions employed. During the subsequent aging process, the hexamethylenetetramine retained in each sphere continues to hydrolyze to ammonia and carbon dioxide thus building a more extensive network of hydrated aluminum oxide. It is generally considered that the strength of the sphere after the aging process is the result of interconnection between molecules of hydrated aluminum oxide in the sphere. Generally, a complete again treatment comprises retaining the hydrogel spheres in the hot oil utilized as the suspending medium in a separate vessel for a period of at least about 10 hours, and then in a suitable alkaline medium for at least about 10 hours, and finally water-washing the spheres to remove soluble salts, such as ammonium salts, reduce the concentration of alkaline reagent and impart additional desirable physical characteristics to the spheres. It is essential that the hydrogel spheres are not contacted with any substantial amount of water prior to the aging treatment in the liquid alkaline medium. The spheres are not water stable at this stage and can be severely damaged by premature treatment with extraneous water. The previously described aging treatment can be suitably effected at a temperature of from about 120° F. at atmospheric pressure, to a temperature of about 500° F. or more at superatmosphere pressure. Proper aging is not readily accomplished at less than about 120° F., and above 210° F. at atmospheric pressure there exists a tendency for the rapid evolution of gases which causes the hydrogen spheres to rupture and otherwise weaken as hereinbefor mentioned. By maintaining a sufficient superatmospheric pressure during the aging process in order to obviate vaporization of water, higher temperatures can be employed with improved results. For example, the liquid alkaline aging can be eliminated. Thus, the spheres may be water-washed immediately following the oil aging. Also, a shorter period of time is required for adequate aging of the hydrogen spheres. The latter can be attributed to a more rapid and complete hydrolysis of the relatively expensive hexamethylenetetramine.

Pressure aging assumes importance when it is realized that spherical particles are produced by the above described oil-drop method in a continuous stream, while aging at atmosperic pressure is a time consuming process whereby the spheres must be transferred to, and aged, in at least two separate vessels to keep apace of the manufacturing process. The present invention relates to the pressure aging phase of the manufacturing process. It is an object of this invention to present a novel and continuous process for the pressure aging of spheroidal hydrogen particles, particularly alumina hydrogel particles.

In the investigation of continuous pressure aging it was observed that a sudden or rapid temperature change in the transfer of hydrogen spheres from the forming process at a relatively low temperature to the aging process at a relatively high temperature, caused a rapid decomposition of the hexamethylenetetramine, contained in the spheres with the sudden evolution of carbon dioxide resulting in serious and permanent damage to the spheres. On the other hand, a gradual heat-up allows for subsequent continuous processing at elevated temperature without the creation of stress cracks or sphere rupture. It was further observed that the desired temperature gradient during the heat-up of the spheres prior to further processing at the elevated temperature was difficult to maintain because of turbulence created in the heat-up zone and caused by carbon dioxide escaping from the subsequent high temperature processing of the spheres.

In one of its broad aspects the present invention relates to a process for the manufacture of spheroidal inorganic oxide particles wherein an inorganic oxide hydrosol comprising, at least in part, an alumina hydrosol, is commingled with a weak base which is substantially stable at normal temperature and increasingly hydrolyzable with temperature and dispersed as droplets in an oil suspending medium and gelled therein at an elevated temperature to form spheroidal hydrogel particles, said particles being thereafter aged in said oil, and embodies an improvement which comprises (a) admitting the spheroidal hydrogel particles to a first zone of a pressure aging vessel in contact with a counterflow of the aforesaid suspending oil at an initial contact temperature of from about 120° F. to about 220° F., effecting a gradual heating of said particles to a temperature of from about 240° F. to about 500° F. at a pressure to maintain the water content of said particles substantially in the liquid phase, effecting said heating by processing said particles downwardly in a dense phase relationship with said oil, said oil being introduced to said first zone at a temperature of from about 240° F. to about 500° F. from a second zone disposed immediately below said first zone and in open communication therewith, said oil being processed upwardly through said first zone and discharged overhead therefrom to effect a temperature gradient therein and insure the aforesaid initial contact temperature, (b) continuing said particles downwardly in contact with said oil through said second zone at a temperature at from about 240° F. to about 500° F. at the aforesaid pressure conditions and hydrolyzing substantially all of the aforementioned weak base in said second zone, (c) cooling said particles to a temperature of from about 120° F. to about 220° F. by continuing said particles downwardly to a third zone disposed immediately below said second zone and in open communication therewith, said particles being processed downwardly in contact with a counterflow of said oil, said oil being charged to the pressure aging vessel at the bottom of said third zone at a temperature of from about 120° F. to about 220° F. from an external source, withdrawing said particles at said temperature and discharging the same from the pressure aging vessel at about atmospheric pressure.

Other objects and embodiments of this invention will become apparent in the following detailed specification.

The present process is better described with reference to the schematic flow diagram shown in the accompanying drawing. The description with reference to the flow diagram illustrates one embodiment of this invention. It is contemplated that other modifications which may be beyond the scope of the flow diagram may be practiced without departing from the generally broad scope of the invention as set out in the appended claims. While the invention is particularly described with respect to the preparation of spheroidal alumina particles, it is understood that the process is similarly applicable to the manufacture of other inorganic oxide spheroidal particles such as silica-alumina, alumina-zirconia, etc., which contain alumina as a component thereof.

As previously mentioned, the present invention relates to a process for the manufacture of spheroidal inorganic oxide particles wherein an inorganic oxide hydrosol is commingled with a weak base and dispersed as droplets in an oil suspending medium wherein they are gelled at an elevated temperature to form spheroidal hydrogel particles. The process is commonly known as the oil-drop method and is described in U.S. Patent 2,620,314 issued to James Hoekstra. While not considered a part of this invention, a forming tower has been included in the drawing as a necessary adjunct to the continuous pressure aging process of this invention. Accordingly, there is shown a blending tank 3 wherein an alumina hydrosol, introduced through line 1 from storage, and hexamethylenetetramine, utilized as the weak base and introduced through line 2 from an external source, are blended in the desired ratio. The alumina hydrosol is then charged through line 4 to a dropping head 5 and dispersed as droplets in the hot oil suspending medium contiuously circulated through the forming tower 6 at about 200° F. The alumina hydrosol droplets, while traversing the hot oil in the forming tower are formed itno semi-solid spheroidal particles which leave the bottom of the forming tower and are transported in the oil through line 7 and deposited in a hopper 8 atop the pressure aging tower 9.

In accordance with the process of this invention, the spheroidal particles in traversing the pressure aging tower 9 from top to bottom, pass through three aging zones labeled 10, 11 and 12 at a pressure to maintain the water content of said particles in substantially liquid phase, said particles being collected in a receiver 37 and thereafter discharged from the pressure aging tower 9 through a valve 13 at about atmospheric pressure. The spheroidal particles are admitted to the first aging zone 10 by means of a valve 14, and are initially contacted therein with a counterflow of oil at a temperature of from about 120° F. to about 220° F., the optimum temperature being selected to correspond with the temperature employed in the aforesaid forming tower 6. Thus, the alumina spheroidal particles of the present example are contacted with the counterflow of oil at an initial contact temperature of about 200° F.

The oil utilized in the pressure aging tower 9 is charged thereto from line 15 as will hereinafter appear. The oil is processed through the three aging zones in the manner and under conditions hereinafter described, the oil being withdrawn overhead from the pressure aging tower 9 through line 16. The oil thus withdrawn is processed through a knock-out pot 17 and thereafter returned to an oil reservoir 18 passing through a pressure reducing valve 19 situated in line 20 and then by way of line 21 to said reservoir 18. In the oil reservoir 18, the oil from the pressure aging tower 9 is combined with oil recovered from the forming tower 6 through line 22. Oil from the reservoir 18 is continuously withdrawn through line 23 and passed through a heating means 24 to be recycled to the forming tower 6 and the pressure aging tower 9, and to serve as a transfer assist in carrying the pressure aged particles from the pressure aging tower 9 to conventional sphere washing means not shown. Thus, the heated oil is charged in part through line 25 as recycle oil to the forming tower 6 and in part through line 26 as recycle oil to the pressure aging tower 9, passing through line 15 including compressor 27 in the process. Hot oil is continued through line 26 to assist in transferring aged particles, discharged from the pressure aging tower through valve 13, the spheres being carried in the oil to the washing section which is not shown. Also, line 21 is utilized to return the oil from the washing process, said oil being combined with return oil from line 20 and returned to the reservoir 18.

Referring again to the first aging zone 10 of the pressure aging tower 9, the spheroidal particles are brought into contact with a counterflow of oil at the described temperature conditions and processed downwardly through the oil in a dense phase passing to a second aging zone 11 through a frustracone section 28 shown within said first aging zone 10. The first aging zone 10 is a heat-up zone, its principal function being to effect a gradual heating of the spheroidal particles to a temperature of from about 240° F. to about 500° F., preferably not exceeding a temperature of about 350° F. A temperature in the preferred range is suitably employed at pressure of from about 40 p.s.i.g. to about 150 p.s.i.g. and sufficient to maintain the water content of the particles in a substantially liquid phase. The heat-up is accomplished by heating the oil to the desired temperature in the second aging zone 11 as hereinafter described and processing the same upwardly through the first aging zone 10 at a rate to establish the desired initial contact temperature therein. This in effect produces a temperature gradient in the first aging zone 10 progressing from a relatively high temperature at the bottom of the zone to a relatively low temperature at the top of the zone. The spheroidal particles are processed downwardly through the first aging zone 10 at a rate to effect the desired gradual heat-up.

The spheroidal particles thus hated in the first aging zone 10 are continued downwardly in a dense phase and pass through the aforesaid frustra-cone section into the second aging zone 11. As a result of the spheroidal particle treatment in the first aging zone 10, the particles can now be processed at relatively high temperatures without the creation of stress cracks or sphere rupture. In aging zone 11 the aging process is virtually completed. The weak base contained in the spheroidal particles, in the present case hexamethylenetetramine, is substantially completely hydrolyzed at a temperature of from about 240° F. to about 500° F., a temperature of from about 240° F. to about 350° F. being more suitable, to form ammonia and carbon dioxide. In the schematic flow diagram provision is made for the collection of carbon dioxide and discharge of the same from the second aging zone 11. Thus, the carbon dioxide passes upwardly as formed into the void space 29 created by the foresaid frustracone 28 and is discharged through line 30 and line 31 passing through a pressure control valve 32 to the atmosphere. The carbon dioxide is separated from the process in the described manner to alleviate the turbulence which would otherwise occur in the first aging zone 10 with the constant disruption of the temperature gradient therein.

In a preferred embodiment, the oil is circulated downwardly in the second aging zone 11 in concurrent flow with the spheroidal particles passing therethrough. In the flow diagram, the oil is withdrawn from the bottom portion of the second aging zone 11 through line 33 and recycles by means of a pump 34 through a heating means 35 to the top portion of said second aging zone 11. It has been found that by processing the oil downwardly in the second aging zone 11 as herein described, a better heat distribution is effected.

Included with the oil withdrawn through line 33 is oil processed upwardly through the hereinafter described third aging zone 12. The net effect of this arrangement is to establish the desired circulation of hot oil downwardly through the second aging zone 11 with excess recycle oil passing upwardly through the first aging zone 10 to effect the desired temperature gradient therein.

The third aging zone 12 is provided to cool the spheroidal particles to a temperature of from about 120° F. to about 220° F. prior to discharge from the pressure aging tower 9 and subsequent washing procedures. Thus, the spheroidal particles pass downwardly into said third aging zone 12 still in a dense phase with the oil contained therein. As has been stated, the oil is charged to the third aging zone 12 through line 15 at a temperature of from about 120 F. to about 220° F. The oil passing upwardly to admix with the hot oil from the second aging zone 11 in effect creates a temperature gradient in the third aging zone 12 so that the spheroidal particles are gradually cooled to the desired temperature. The flow of spheroidal particles through the pressure aging tower 9 is regulated by a level controller 36, which activates the particle discharge valve 13 whereby the spheroids are discharged into line 26 at atmospheric pressure.

Alumina hydrogen spheroids, manufactured by the oil-drop method herein described, were subjected to continuous pressure aging by the process of this invention at the rate of 100 pounds per day at the following process conditions:

| Pressure Aging Zone | 1 | 2 | 3 |
|---|---|---|---|
| Pressure, p.s.i.g. | 95 | 95 | 95 |
| Time, hrs. | 1.03 | 1.50 | 0.55 |
| Temperature, °F.: | | | |
| Top | 240 | 307 | |
| Middle | 267 | 310 | 265 |
| Bottom | 300 | 307 | 200 |
| Oil Rate, gal./hr. | 3.5 | 42.0 | 3.5 |

After the aging treatment, the spheres are washed in any suitable manner. A particularly satisfactory method is to wash the spheres by percolation, either with upward or downward flow of water, and preferably with water containing a small amount of ammonium hydroxide and/or ammonium nitrate. After washing, the spheres may be dried at a temperature of from about 200° F to about 600° F. for 6–24 hours or more, or dried at this temperature and then calcined at a temperature of from about 800° F. to about 1400° F. for 2–12 hours or more, and then utilized as such or composited with other catalytic components. It is preferred that the spheres be dried slowly and also that the drying be effected in a humid atmosphere because this has been found to result in less breakage of the spheres.

As hereinbefore set forth, the alumina spheres may be used as an adsorbent, or refining agent to treat organic compounds, and are also particularly satisfactory for use as a component of a catalyst. These spheres are particularly suitable for use as a component of a reforming catalyst comprising alumina, from about 0.01% to about 1% by weight of platinum and from about 0.1 to about 8% by weight of combined halogen. Another particularly suitable catalyst comprises alumina composited with from about 5 to about 40% by weight of a compound and particularly an oxide of one or more elements in the left hand columns of Groups IV, V and VI of the Periodic Table, which catalysts are utilized in reforming, hydrogenation, dehydrogenation, dehydrocyclization, etc. of hydrocarbons or other organic compounds. Typical catalysts of this type include alumina-chromia, alumina-molybdena, alumina-vanadia, etc.

The reforming catalyst is utilized for the treatment of a gasoline at a temperature of from about 800° to about 1100° F. at a superatmospheric pressure of from about 100 to about 1000 pounds per square inch in the presence of hydrogen. The hydrogenation reactions are effected at temperatures of from about 800° to about 1200° F. and usually at moderate superatmospheric pressures which are below about 50 pounds per square inch. Hydrogenation reactions are effected at lower temperatures and higher pressures which generally may range from about 200° to about 600° F. and pressures of from about 200 to about 1000 pounds or more per square inch.

The alumina spheres may be used as contacting agents or as treating or refining agents for organic compounds and, thus, may find utility in effecting dehydration reactions, dehydrohalogenation reactions, desulfurization reactions, etc.

I claim as my invention:

1. In a process for the manufacture of spheroidal inorganic oxide particles wherein an inorganic oxide hydrosol comprising, at least in part, an alumina hydrosol is commingled with a weak base, which is substantially stable at normal temperature and increasingly hydrolyzable with temperature, and dispersed as droplets in an oil suspending medium and gelled therein at an elevated temperature to form spheroidal hydrogel particles, said particles being thereafter aged in said oil, the improvement which comprises:

(a) admitting the spheroidal hydrogel particles to a first zone of a pressure aging vessel in contact with a counterflow of the aforesaid suspending oil at an initial contact temperature of from about 120° F. to about 220° F., effecting a gradual heating of said particles to a temperature of from about 240° F. to about 500° F. at a pressure to maintain the water content of said particles substantially in the liquid phase, effecting said heating by processing said particles downwardly in a dense phase relationship with said oil, said oil being introduced to said first zone at a temperature of from about 240° F. to about 500° F. from a second zone disposed immediately below said first zone and in open communication therewith, said oil being processed upwardly through said first zone and discharged overhead therefrom to effect a temperature gradient therein and insure the aforesaid initial contact temperature, (b) continuing said particles downwardly in contact with said oil through said second zone at a temperature of from about 240° F. to about 500° F. at the aforesaid pressure conditions and hydrolyzing substantially all of the aforementioned weak base in said second zone, (c) cooling said particles to a temperature of from about 120° F. to about 220° F. by continuing said particles downwardly to a third zone disposed immediately below said second zone and in open communication therewith, said particles being processed downwardly in contact with a counterflow of said oil, said oil being charged to the pressure aging vessel at the bottom of said third zone at a temperature of from about 120° F. to about 220° F. from an external source, withdrawing said particles at said temperature and discharging the same from the pressure aging vessel at about atmospheric pressure.

2. In a process for the manufacture of spheroidal inorganic oxide particles wherein an inorganic oxide hydrosol comprising, at least in part, an alumina hydrosol is commingled with a weak base, which is substantially stable at normal temperature and increasingly hydrolyzable with temperature, and dispersed as droplets in an oil suspending medium and gelled therein at an elevated temperature to form spheroidal hydrogel particles, said particles being thereafter aged in said oil, the improvement which comprises:

(a) admitting the spheroidal hydrogel particles to a first zone of a pressure aging vessel in contact with a counterflow of the aforesaid suspending oil at an initial contact temperature of from about 120° F. to about 220° F., effecting a gradual heating of said particles to a temperature of from about 240° F. to about 350° F. at a pressure of from about 40 p.s.i.g. to about 150 p.s.i.g. and sufficient to maintain the water content of said particles substantially in the liquid phase, effecting said heating by processing said particles downwardly in a dense phase relationship with said oil, said oil being introduced to said first zone at a temperature of from about 240° F. to about 350° F. from a second zone disposed immediately below said first zone and in open communication therewith, said oil being processed upwardly through said first zone and discharged overhead therefrom to effect a temperature gradient therein and insure the aforesaid initial contact temperature, (b) continuing said particles downwardly through said second zone in contact with said oil, said oil being circulated downwardly through said second zone and withdrawn from the bottom thereof, said oil being recycled to the top of said second zone together with oil withdrawn from the top of a hereinafter described third zone disposed immediately below said second zone and in open communication therewith, the oil being recycled through a heating means to maintain said second zone at about 240° F. to about 350° F. and to effect an overflow of said oil into said first zone passing upwardly therethrough as aforesaid, hydrolyzing substantially all of the aforementioned weak base in said second zone and discharging the resulting gaseous products to the atmosphere from said second zone, (c) cooling said particles to a temperature of from about 120° F. to about 220° F. by continuing said particles downwardly through the aforesaid third zone in contact with a counterflow of said oil, said oil being charged to the pressure aging vessel at the bottom of said third zone at a temperature of from about 120° F. to about 220° F. from an external source and processed upwardly through said third zone, withdrawing said particles at said temperature and discharging the same from the pressure aging vessel at about atmospheric pressure.

3. The improvement of claim 2 further characterized in that said inorganic oxide hydrosol is an alumina hydrosol, and further characterized in that said weak base is hexamethylenetetramine.

4. The improvement of claim 2 further characterized in that said inorganic oxide hydrosol is a silica-alumina hydrosol, and further characterized in that said weak base is urea.

5. The improvement of claim 3 further characterized in that carbon dioxide formed by hydrolysis of hexamethylenetetramine in said second zone is collected and discharged from the second zone whereby to alleviate turbulence in said first zone.

References Cited

UNITED STATES PATENTS 2,865,866   12/1958   Hoekstra _____ 252—448
3,096,295   7/1963    Michalko _____ 252—448

PATRICK P. GARVIN, Primary Examiner